United States Patent
Desnijder

(10) Patent No.: US 6,971,439 B1
(45) Date of Patent: Dec. 6, 2005

(54) PROTECTIVE SCREEN ARRANGEMENT FOR AN AGRICULTURAL MACHINE

(75) Inventor: Dirk J. Desnijder, Wondelgem (BE)

(73) Assignee: CNH America LLC, New Holland, PA (US)

( * ) Notice: Subject to any disclaimer, the term of this patent is extended or adjusted under 35 U.S.C. 154(b) by 228 days.

(21) Appl. No.: 10/129,699

(22) PCT Filed: Nov. 10, 2000

(86) PCT No.: PCT/EP00/11248

§ 371 (c)(1),
(2), (4) Date: May 8, 2002

(87) PCT Pub. No.: WO01/36794

PCT Pub. Date: May 25, 2001

(30) Foreign Application Priority Data

Nov. 12, 1999 (GB) .................................... 9926771

(51) Int. Cl.[7] ........................... F28F 19/00; F28G 3/00; B60J 5/00; F01P 11/12; A01D 78/18
(52) U.S. Cl. ............................ 165/41; 165/51; 165/95; 165/119; 55/269; 55/290; 49/246; 49/248; 16/354; 16/371; 296/146.12
(58) Field of Search .............................. 165/41, 51, 95, 165/119; 55/269, 290; 49/246, 248; 16/354, 16/371; 296/146.12

(56) References Cited

U.S. PATENT DOCUMENTS

| 2,991,117 | A | * | 7/1961 | Tatter |
| 3,016,261 | A | * | 1/1962 | Tatter |
| 3,938,586 | A | * | 2/1976 | Barlow et al. |
| 4,334,633 | A | * | 6/1982 | Piegza |
| 4,696,361 | A | * | 9/1987 | Clark et al. |
| 4,889,382 | A | * | 12/1989 | Burst et al. |
| 5,595,537 | A | * | 1/1997 | Jungemann et al. |
| 5,676,197 | A | * | 10/1997 | Diebold et al. |
| 6,234,563 | B1 | * | 5/2001 | Bascou |

FOREIGN PATENT DOCUMENTS

DE 19547348 * 7/1997

* cited by examiner

*Primary Examiner*—John K. Ford
(74) *Attorney, Agent, or Firm*—John William Stader

(57) ABSTRACT

An agricultural machine is described with a screen for protecting a part of a cooling system of a motor mounted on the agricultural machine, the screen being mounted in its operational position adjacent the cooling system, wherein the screen is movable from the operational position next to the cooling system of the motor to a position in which the screen lies outside the envelope defining the outer form of the agricultural machine, the screen being hingedly connected to the agricultural machine so that the initial trajectory of the screen is horizontal and substantially perpendicular to the longitudinal axis of the agricultural machine, and that a further second trajectory of the screen is horizontal and substantially circular, having its centre of curvature on or adjacent a first hinge position.

8 Claims, 5 Drawing Sheets

PROTECTIVE SCREEN ARRANGEMENT FOR AN AGRICULTURAL MACHINE

TECHNICAL FIELD

The present invention relates generally to self-propelled agricultural machinery such as forage harvesters, having a drive motor and a protective screen in front of an air intake of the cooling system of the motor, e.g. for a cooling fan and/or a radiator.

TECHNICAL BACKGROUND

A self-propelled agricultural machine typically has a drive motor for driving the machine and for operating one or more functional units, e.g. cutterhead, crop processors, blowers. The motor is usually an internal combustion engine, e.g. a diesel motor, which has a cooling system including a radiator and often a fan for drawing in or blowing air through the radiator. Such agricultural machines are subject to large amounts of dust, dry leaves and other crop materials which are thrown up around the machine as it progresses across the field. In addition insects may be disturbed by the machine and be drawn towards the air inlet for the cooling system of the motor. To prevent such materials and objects from blocking the radiator, a protective screen is placed in front of the radiator and/or fan. Protective screens are often rotated past a solid plate in order to facilitate removal of accumulated material from the outer screen surface.

DE-A-195 47 348 shows a forage harvester comprising a motor or engine mounted to the rear of the machine. The protective screen and the radiator have an asymmetric position in the vehicle along the side shielding of the harvester. Access to components behind the screen is easily obtained by swinging the screen outwardly about a vertical axis. However, the position of the filled radiator and the screen cause a disadvantageous distribution of the weight of the vehicle.

For an in-line arrangement of an agricultural machine as shown schematically in FIG. 1, a diesel motor 60 may located behind an agricultural functional unit located beneath the cab 22. The main drive shaft of the motor is parallel with the longitudinal axis of the machine. The machine has a frame 1 to which major items are anchored. The motor 60 has a radiator 64, a cooling fan 62 and a rotating screen 68 all in line with the front-rear axis of the machine. Typically, the radiator 64, cooling fan 62 and the rotating screen 68 (in total a cooling block) are mounted between the motor 60 and the cab 22. This places the motor 60 at the most rearward part of the machine which provides a counterweight to the weight of the functional units at the front, for instance it avoids or reduces the use of counter-weights at the back of the machine. Although weight distribution on the machine is solved in this way, it results in the cooling block being located between the motor 60 and the cab 22. In order to allow access to the screen 68 and to remove this for servicing of the radiator 64 and/or the functional units it is conceivable to allow a space 70 in front of screen 68. This space 70, however, increases the overall length of the machine so that it is preferred if this space 70 can be reduced to a minimum. As the screen 68 comes closer to the cab 22, the chance of interference with other components such as the tires of the front wheels 2 increases when the screen is pivoted away from the radiator. Further, providing adequate access to the cooling system and/or the functional units becomes more difficult.

One advantage of the in-line motor arrangement is that the cooling air flow from the fan 62 can be directed onto and along both sides and the top of the motor 60 thus reducing the chances of accumulation of dry crop material or leaves on exposed hot spots on the motor 60 which could reach such a temperature that dry crop material or leaves are set alight.

It is an objective of the present invention to provide a better arrangement for moving the screen in order to gain access to the cooling system and/or other functional units of an agricultural machine.

SUMMARY OF THE INVENTION

The present invention provides an agricultural machine with a screen for protecting a part of a cooling system of a motor mounted on the agricultural machine, the screen being mounted in its operational position substantially perpendicular to the longitudinal axis of the machine and adjacent the cooling system wherein the screen is movable from the operational position next to the cooling system of the motor to a position in which the screen lies outside the envelope defining the outer form of the agricultural machine, characterised in that the screen is being hingedly connected to the agricultural machine so that the initial trajectory of the screen is horizontal and substantially perpendicular to the longitudinal axis of the agricultural machine, and that a further second trajectory of the screen is horizontal and substantially circular, having its centre of curvature on or adjacent a first hinge position.

The first trajectory may be substantially translational, i.e. with no or little rotation of the screen with respect to the machine. The screen is preferably supported-during its trajectory by an elongate support member or frame, the support member being hingedly connected to the agricultural machine at one end of the member by a first vertical hinge at the first hinge position and the screen is hingedly connected to one other end of the support member via a second vertical hinge between the screen and the member at a second hinge a position. The second hinge position is preferably offset from the centre of the screen so that the screen can swing out like a door in an optional third trajectory thus leaving even more space for access to the cooling system. The first hinge position is preferably in front of or behind the operational screen position with reference to the longitudinal axis of the machine. Preferably the screen has an air inlet direction which is parallel to the longitudinal axis of the machine and the screen mesh is supported by a plate or frame which lies in a plane perpendicular to the longitudinal axis. Preferably, the first hinge position lies close to a line parallel to the longitudinal axis of the machine which passes through one lateral extremity of the screen support plate or frame. A line joining the first hinge position to the extremity preferably makes an acute angle, preferably an angle of 10° or less, to the longitudinal axis of the machine. The first hinge position preferably lies closer to the central longitudinal axis of the machine than the screen support plate or frame extremity. Preferably, the motor, a part of the cooling system and the screen are arranged along the longitudinal axis of the machine. Typically, the part of the cooling system will be a radiator. A fan may be mounted in-line with respect to the motor, the part of the cooling system and the screen.

The dependent claims define further individual embodiments of the present invention. An agricultural machine and a method of its operation in accordance with the present invention will now be described in greater detail, by way of example, with reference to the accompanying drawings.

DETAILED DESCRIPTION OF THE ILLUSTRATIVE EMBODIMENTS

The present invention will be described with reference to certain embodiments and certain drawings but the invention is not limited thereto but only by the claims. The drawings are schematic. The terms "front", "rear", "forward", "rearward", "right" and "left" used throughout the specification are determined with respect to the normal direction of movement of the machine in operation and are not to be construed as limiting terms.

Figure 1:
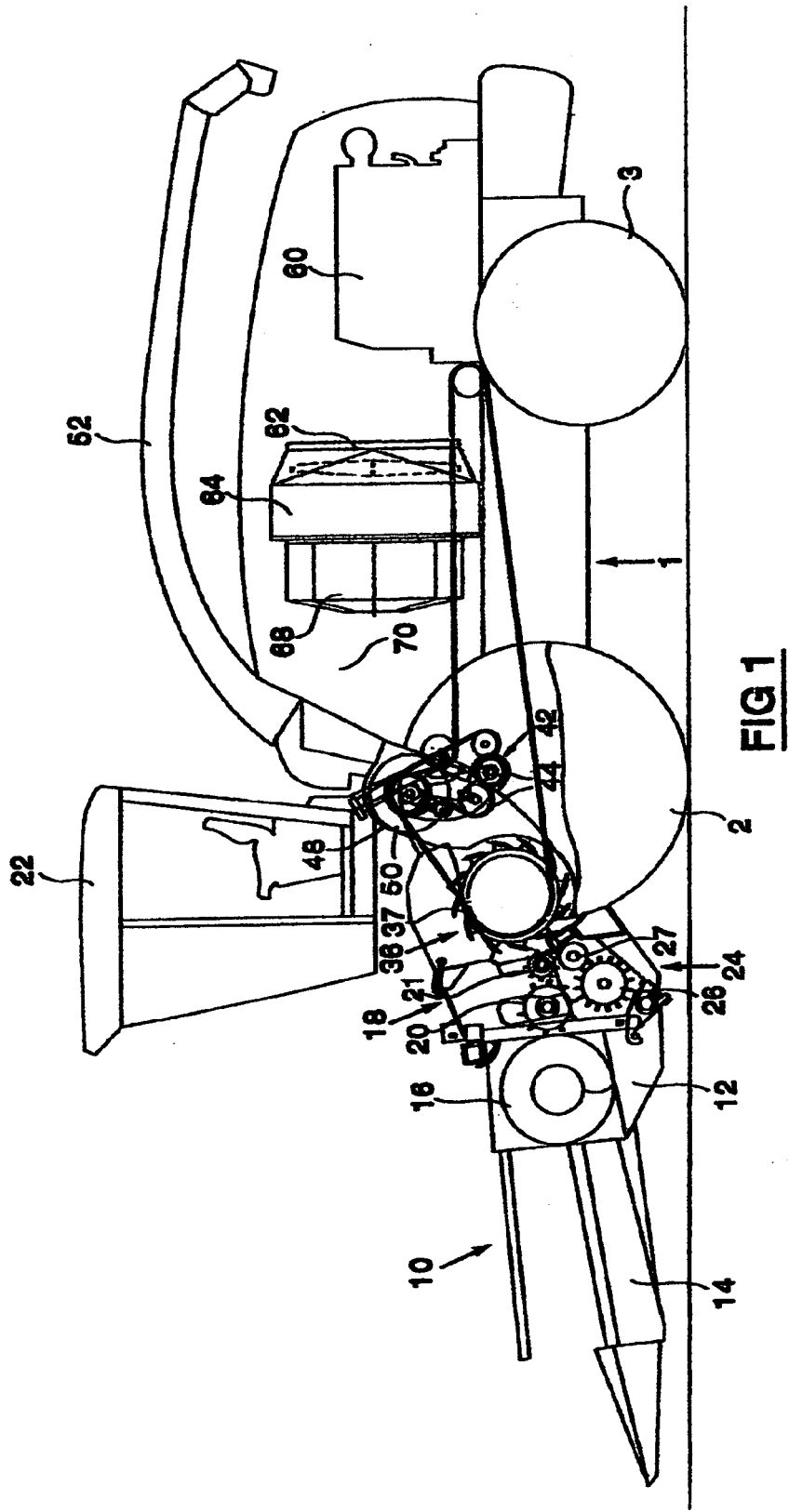
FIG. 1 is a schematic side elevational view of an agricultural machine with which the present invention may be used.

With reference to the drawings and more particularly to FIG. 1, there is shown an agricultural machine, e.g. a forage harvester, having a main frame 1 on which are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

The forage harvester has feeding means which comprise lower feeder means, including a forward lower feed roll 26, and a smooth, rear lower feed roll 27, and upper feeder means, including an upper forward feed roll 20 and an upper rear feed roll 21. The lower feed rolls 26, 27 are rotatably mounted in a lower feeder frame 24 and the upper feed rolls 20, 21 are mounted in an upper feeder frame 18, to which the row crop attachment 10 is attached. The upper and lower feeder means rotate to convey the crop material in-between to a cutter-head 36, which comprises a plurality of knives 37, generating a cylindrical peripheral shape or profile, when the cutter-head 36 is rotated.

The knives 37 co-operate with a fixed shearbar to cut the crop material to length. A crop processor roll assembly 42 is provided comprising a set of counter-rotating compressor rolls 44 mounted therein, which rolls crack the kernels which are left in the chopped material. The compressor rolls 44 may have a substantially cylindrical, fluted surface. The cutter-head 36 projects the cut material into the bite of the compressor roll assembly 42. This delivers the crushed maize kernels to a blower 50 which is installed within a blower housing 48. The blower 50 comprises a plurality of paddles, which throw the material upwardly through the blower or accelerator outlet into a discharge spout 52, which can be positioned by an operator to direct the cut crop material as required, normally into a wagon which is moving alongside or behind the forage harvester.

Figure 2:
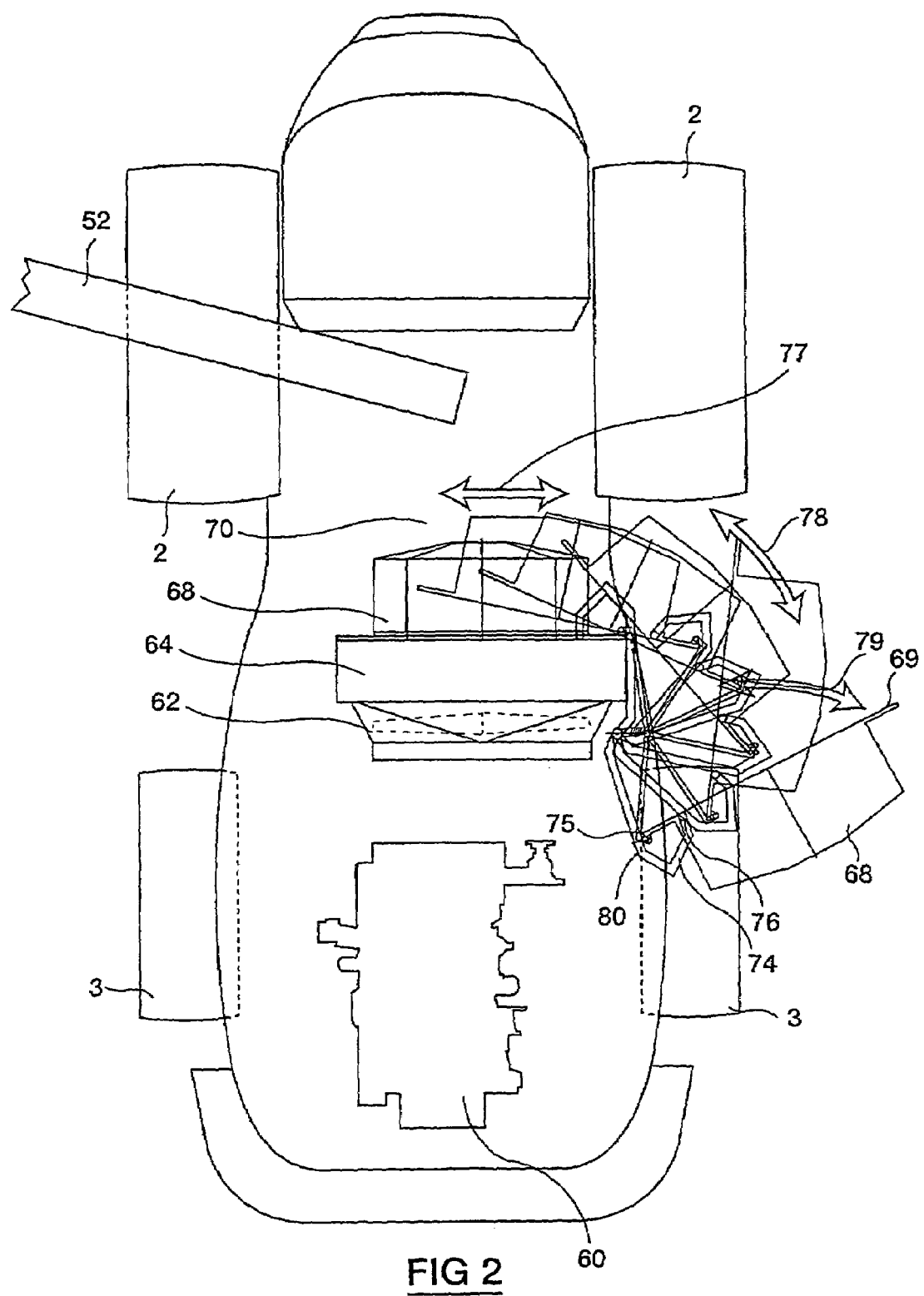
FIG. 2 is a schematic top view of the agricultural machine of FIG. 1 showing the first to third trajectories of a protective screen in accordance with an embodiment of the present invention.

FIG. 2 is a schematic top view of the agricultural machine of FIG. 1. A motor 60, e.g. a diesel engine, is mounted between the rear wheels 3. A radiator 64 is located in-line with the motor 60 as well as a fan mounted in a fan housing 62 for drawing air through the radiator 64. In front of the radiator, a dust screen, preferably a rotating screen 68 is mounted in such a way that it can swing out along a first trajectory 77 followed by a second trajectory 78 and an optional third trajectory 79. Trajectory 77 is characterised by an initial section starting from the normally operational position of screen 68 when it is directly in front of radiator 64, the initial section consisting substantially of a translational movement substantially perpendicular to the longitudinal axis of the agricultural machine. In a middle portion, the further trajectory 78 of screen 68 rotates through an angle to a point where it is has turned through an angle of about 60 to 90° from its operational position. From this point on a third optional trajectory 79 can be used which is mainly a rotation about a hinge 76 until the screen 68 has moved an angular distance of between 135 and 180° compared with its starting position.

An advantage of the initial substantially translational motion of the screen 68 in trajectory 77 is that the space 70 in front of the screen 68 can be kept to a minimum. Also, the movement of the screen 68 does not interfere with the tire of front wheel 2. However, once trajectory 77 is completed, trajectories 78 and 79 take the screen 68 completely away from the space 70 and outside the envelope defined by the outside contours of the machine thus allowing access from both sides of the machine.

To achieve the three trajectories 77 to 79 one embodiment of the present invention will now be described. Typically, the screen 68 will be mounted on a support 69, e.g. a frame or plate. The screen 68 is rotatably connected to a part of the frame 1, or a subframe or other structural component connected to the frame 1 at a first hinge position 75 via a support member 74. The screen 68 is also rotatably connected to the member 74 at a second hinge position 76 which may be on the support 69. Preferably two members 74 are used, one at or near the top and one at or near the bottom of the screen 68. The double hinge attachment (75, 76) of the screen 68 allows the screen 68 to follow the trajectories 77–79. Preferably, the one or more elongate support members 74 are attached at one end to a position either axially behind or in front of the screen 68 so that the initial motion is the tangent to a circle whose centre lies either axially in front or behind the screen 68. Preferably, the centre of the circle, i.e. the first hinge position 75 is placed so that the initial motion of screen 68 is substantially perpendicular to the longitudinal axis of the agricultural machine. The second hinge position 76 is preferably placed towards a side of the screen 68 (i.e. offset from the centre of the screen 68) so that rotation about this hinge 76 swings the screen 68 away from the agricultural machine like a door and not simply about its own axis. Member 74 may be straight or may advantageously have a first bend 80 to clear the radiator 64 when the screen 68 is in the operational position. Member 74 may be composed of individual struts or be part of a frame.

Figure 3:
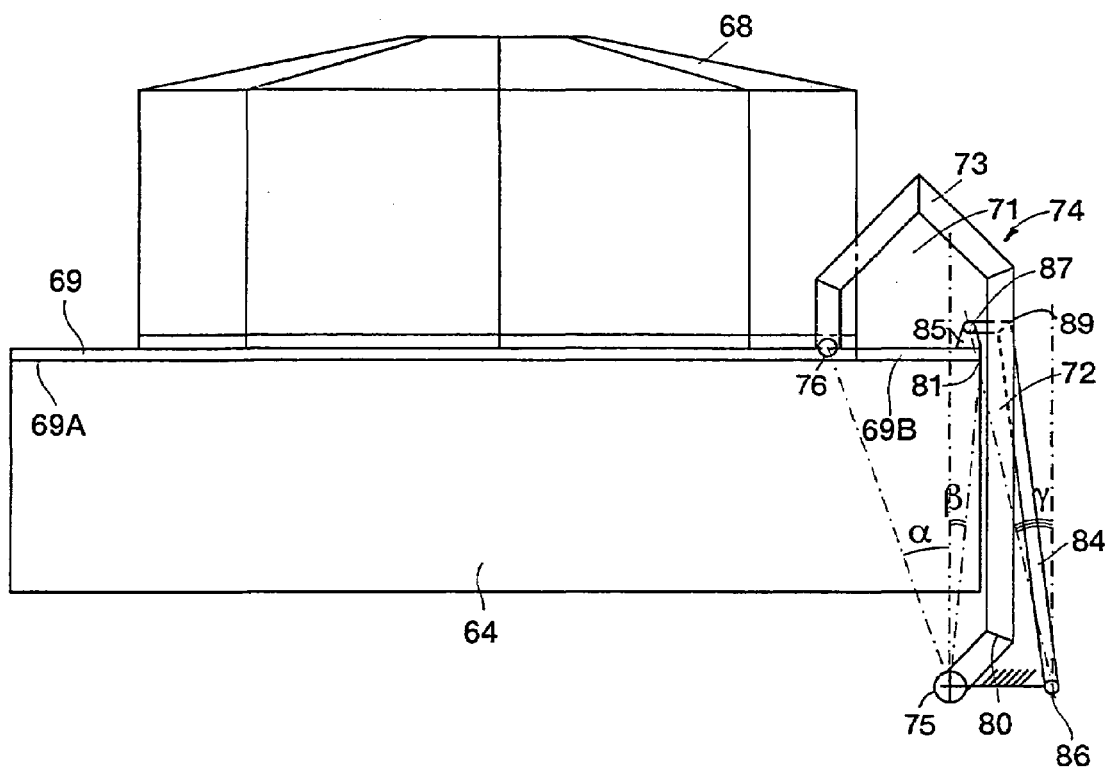
FIG. 3 is a schematic top view of a detail of a support member and guide rod assembly in accordance with an embodiment of the present invention.

In a preferred embodiment the member 74 has a generally hook shape with a first bend 80, straight shank portion 72 and a hook portion 73 defining a space 71 as shown best in FIG. 3. The extreme end of the hook portion 73 is connected to the hinge at the second hinge position 76. The screen 68 is mounted on support 69 so that there are portions 69A and B of the support 69 which extend beyond the outer edge of the screen 68. The second hinge position 76 is located closer to the centre of the screen than the outer edge of support 68 so that the angle α between the line connecting hinge positions 75, 76 and the normal to support 69 of screen 68 is acute, e.g. 30° or less, more preferably 20° or less. The first hinge position 75 may be located so that the angle between the first hinge position 75 and an extreme edge 81 of the support 69 makes an acute angle β with respect to a normal to the support 69, This angle β is preferably smaller than α and is preferably in the range 0 to 100. The first hinge 75 is placed closer to the central longitudinal axis of the machine than the extreme edge of the support 69. The angle α may not be too large otherwise the screen 68 moves too far away from the radiator 64 during the first trajectory 77 thus requiring more forward space 70. As the trajectory 77 continues the edge 81 of support 69 tucks into the hook region 71 thus allowing the screen 68 to remain substantially perpendicular to the longitudinal axis of the machine, i.e. not to rotate about the hinge position 76 initially, In this way the initial trajectory 77 of the screen is substantially perpendicular to the longitudinal axis of the machine. In the further trajectory 78 the screen 68 mainly rotates about the first hinge position 75, i.e. in a substantially circular manner. At the end of the second trajectory 78, the screen 68 may be rotated only around hinge position 76, i.e. swinging screen 68 like a door, in a third trajectory 79.

Figure 4:
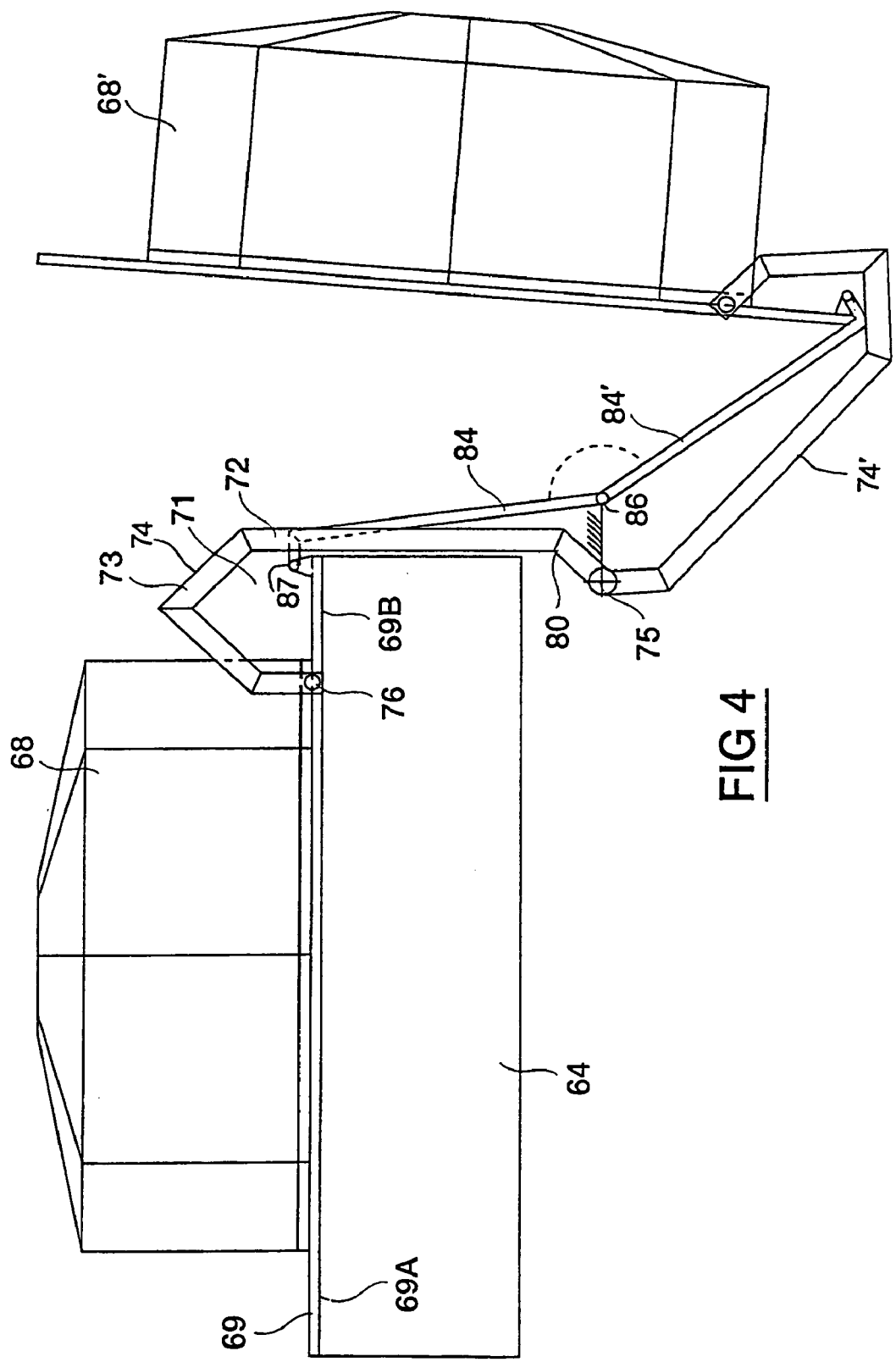
FIG. 4 is a schematic top view of the detail of the support member and guide rod assembly shown in FIG. 3 showing the operational position and an opened position of the protective screen.
Figure 5:
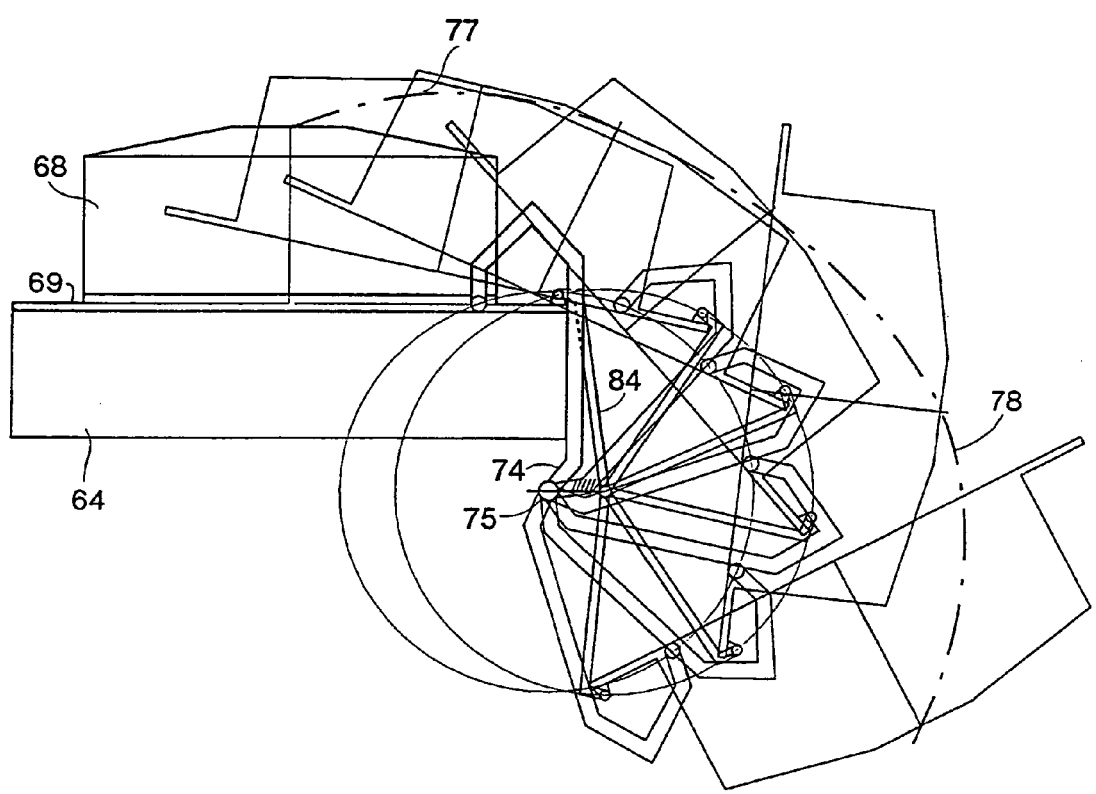
FIG. 5 is a schematic representation of the first and second trajectories of the assembly shown in FIG. 3.

The screen 68 may be guided along the trajectory 77 by hand. However, in accordance with another, preferred embodiment of the present invention a guide member may be used to positively control the movement of screen 68. Such a guide member may be a guide rod 84 as shown in FIGS. 3 to 5. The rear end of rod 84 is hingedly connected at a position 86 to the frame 1 near the hinge position 75 but located further away from the central longitudinal axis of the machine. The front end of rod 84 is hingedly connected at position 87 to the front face of support 69. The rod 84 has a bend 89 to provide room for the edge 81 of the radiator housing. The angle γ between the normal to the screen support 69 and the line connecting hinge positions 86, 87 is preferably acute, preferably smaller than the angle α. This arrangement forms a parallelogram-type linkage formed by the member 74, the rod 84 and portions of frame 1 and support 69 between the hinge positions 75, 86 and 76, 87 respectively. Such a linkage effects a substantially parallel movement of the support member 74 and the rod 84 during the initial phase of trajectory 77. Preferably, the front hinge position 87 of the guide rod 84 lies forwards of the first second hinge position 76 of the support member 74, i.e. the hinge position is located further away along a normal to support 69 with reference to the hinge position 86 than the hinge position 76. To achieve this hinge position 87 may be located on a boss 85 attached to the front face of support 69. The discrepancy in effective length of member 74 and rod 84 induces a substantially circular movement of screen 68 during the further trajectory 78. The complete trajectory is shown schematically in FIG. 5. Due to is the guide rod 84 the final trajectory 79 is prevented. However, as an additional option, the rod 84 could be decoupled from one of the hinge positions 86, 87 or separated in the middle thereof and then the screen 68 swung about hinge position 76 like a door.

While the invention has been shown and described with reference to preferred embodiments, it will be understood by those skilled in the art that various changes or modifications in form and detail may be made without departing from the scope and spirit of this invention as defined by the claims. For instance, member 74 need not be of fixed length, it could also be provided with a hydraulic cylinder so that its length can be varied.

What is claimed is:

1. An agricultural machine with a screen for protecting a part of a cooling system of a motor mounted on the agricultural machine, the screen being mounted in its operational position substantially perpendicular to the longitudinal axis of the machine and adjacent the cooling system wherein the screen is movable from the operational position next to the cooling system of the motor to a position in which the screen lies outside the envelope defining the outer form of the agricultural machine, wherein said screen is hingedly connected to the agricultural machine so that the initial trajectory of the screen is horizontal and substantially perpendicular to the longitudinal axis of the agricultural machine, and that a further second trajectory of the screen is horizontal and substantially circular, having its centre of curvature on or adjacent a first hinge position, further comprising an elongate support member, the support member being hingedly connected to the agricultural machine at one end of the member by a first vertical hinge at the first hinge position and the screen is hingedly connected to one other end of the support member via a second vertical hinge between the screen and the member at a second hinge position, wherein the second hinge position is offset from the centre of the screen, the first hinge position is in front of or behind the operational screen position with reference to the longitudinal axis of the machine, the motor, a part of the cooling system and the screen are arranged along the longitudinal axis of the machine and part of the cooling system is a radiator, further comprising a fan mounted in-line with respect to the motor, the part of the cooling system and the screen and further comprising a guide member, the guide member being hingedly connected to the agricultural machine at one end of the member by a third vertical hinge at a third hinge position and the screen is hingedly connected to one other end of the guide member via a fourth vertical hinge at a fourth hinge position, the lines joining the first and second hinge positions and the third and fourth hinge positions being substantially parallel when the screen is in its operational position.

2. The machine according to claim 1, wherein the third hinge position is located farther away from the central axis of the machine than the first hinge position, and the fourth hinge position is located further away from the centre of the screen than the second hinge position.

3. The machine according to claim 2, wherein the effective length of the guide member is longer than the effective length of the support member.

4. The machine according to 3, further comprising a first angle (α) between the line joining the first and second hinge positions and the longitudinal axis of the machine is acute, less than 30° when the screen is in the operational position.

5. The machine according to claim 4, further comprising a second angle (γ) between the line joining the third and fourth hinge positions and the longitudinal axis of the machine is acute, preferably less than the first angle (α).

6. The machine according to claim 5, further comprising a third angle (β) between the line joining the first hinge position and a terminating edge of the screen which is remote from the centre line of the machine in a horizontal direction is less than the first angle (α).

7. The machine according to claim 6, characterised in that the screen and support member or adapted to allow a third trajectory after the second trajectory, the third trajectory being a rotation of the screen about the second hinge.

8. The machine according to 4, further comprising a first angle (a) between the line joining the first and second hinge positions and the longitudinal axis of the machine is acute, less than 20' when the screen is in the operational position.

* * * * *